(No Model.)   2 Sheets—Sheet 1.
J. HALL.
COTTON STALK PULLER.
No. 595,456.   Patented Dec. 14, 1897.
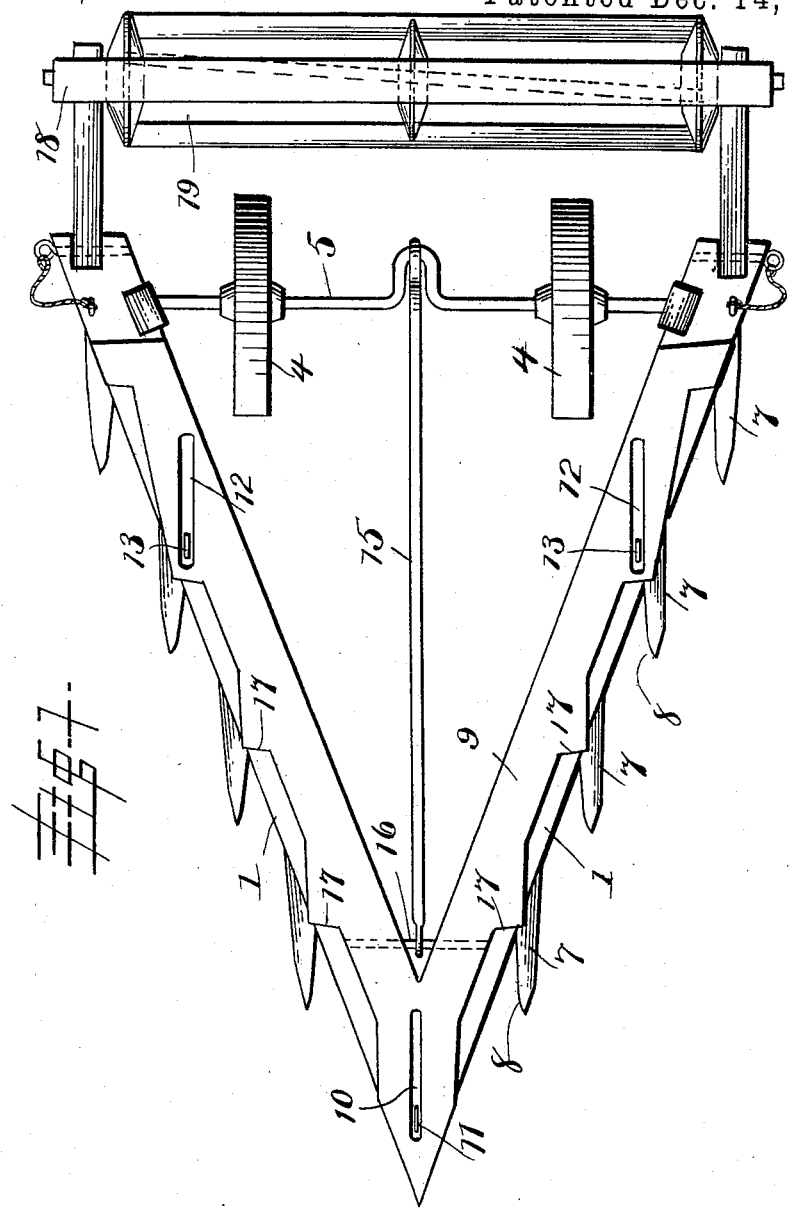
Witnesses
W. E. Bowen
J. A. Willson
Inventor
Jesse Hall
by H. B. Willson
Attorney

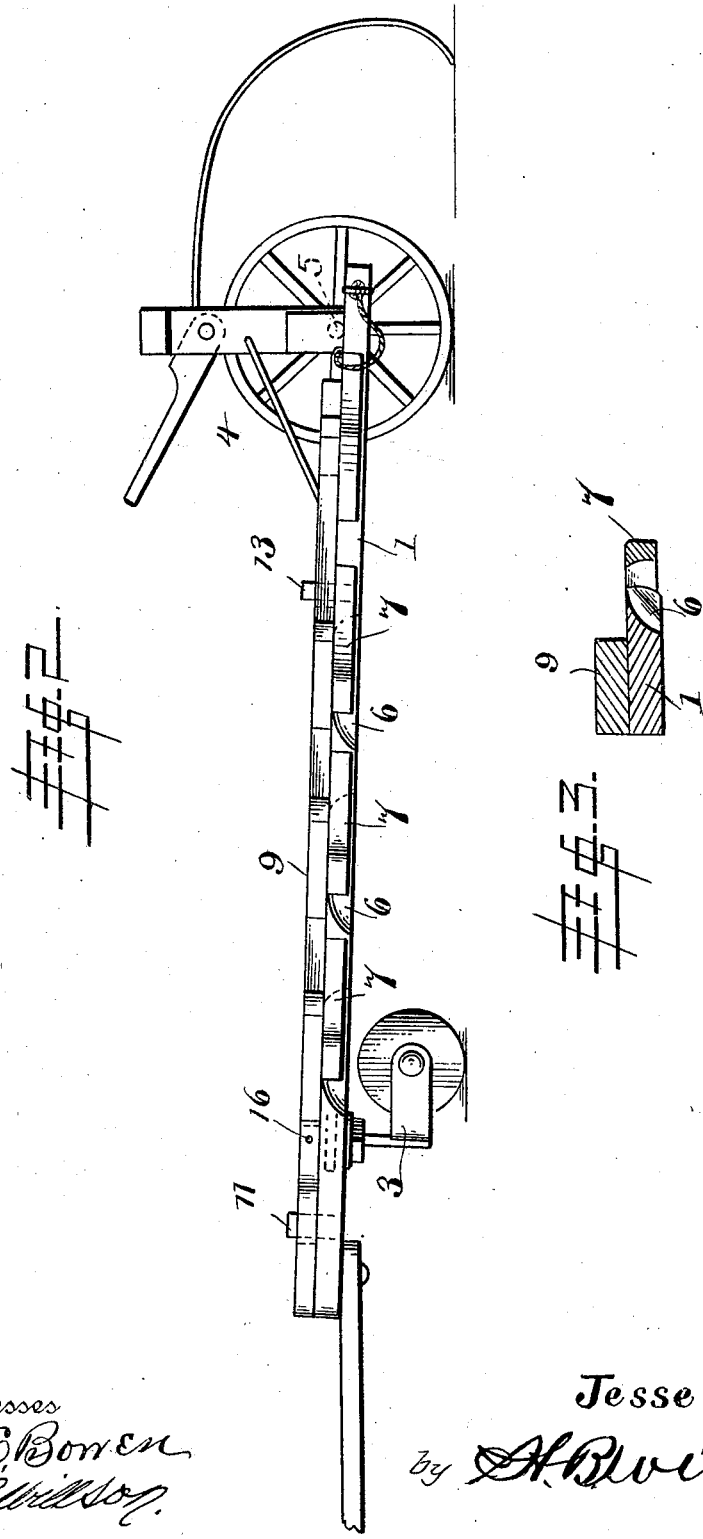

UNITED STATES PATENT OFFICE.

JESSE HALL, OF SURRENCY, GEORGIA.

COTTON-STALK PULLER.

SPECIFICATION forming part of Letters Patent No. 595,456, dated December 14, 1897.

Application filed June 8, 1897. Serial No. 639,866. (No model.)

*To all whom it may concern:*

Be it known that I, JESSE HALL, a citizen of the United States, residing at Surrency, in the county of Appling and State of Georgia, have invented certain new and useful Improvements in Cotton-Stalk Pullers; and I do declare the following to be a full, clear, and exact description of the invention, such as will enable others skilled in the art to which it appertains to make and use the same.

My invention has relation to a cotton-stalk puller.

The object of my invention is to provide a machine of this character which will pull up the corn or cotton stalks by the roots and which will cut said stalks after they have thus been pulled up or collect and stack the same, as may be desired, thus leaving the ground in good condition to be plowed.

With this object in view the invention consists in certain features of construction and combination of parts, which will be hereinafter fully described and claimed.

In the accompanying drawings, Figure 1 is a top plan view of my invention, showing the rake removed. Fig. 2 is a side view with the cutter-frame removed, showing the device equipped with the rake for gathering up the stalks and dumping them into piles; and Fig. 3 is a cross-sectional view through one of the side pieces of the frame and the puller-arm.

In said drawings, 1 denotes the frame, preferably triangular in outline. The front end of this frame is supported by a swiveled caster 3 and the rear end by the drive-wheels 4, mounted on a crank-axle 5, journaled at the rear end of the frame. The sides of this frame are beveled at predetermined intervals to form grasping edges 6, while immediately at the rear of each beveled portion projects outwardly at a right angle to the length of the side pieces a puller-arm 7, which is correspondingly beveled, as shown at 8. As the machine is drawn along these arms are adapted to act in conjunction with the beveled portion of the side pieces to grasp and pull the stalks up by the roots, and in order to clear the puller-arms and prevent clogging of the stems I provide a clearer-frame 9, which in outline corresponds with that of the frame 1 and is provided with slots 10 near its rear end, which extend oblique to the length of the side pieces of said clearer-frame and through which project studs 11, fixed to the main frame. The forward end of the clearer-frame is provided with a longitudinal slot 12, through which projects a stud 13, fixed at the front end of the main frame.

15 denotes a pitman connected at one end to the crank-shaft and at the other end to a cross-rod 16, secured at the front end of the clearer-frame. It is therefore evident that as the machine is drawn along the crank-shaft will cause the clearer-frame to reciprocate and the clearing-shoulders 17 of said frame to slide over the space between the beveled portions of the main frame and the puller-arms and disengage or remove from said puller-arms the stalks which have been pulled thereby.

If it is desired to cut the stalks into fine pieces after they have been pulled, I connect the rear end of the frame and cutter-frame 18, in which is journaled a rotary cutter 19, which, being in contact with the ground, will cut into small pieces the extracted stalks. This frame, however, may be dispensed with and a rake substituted, as shown in Fig. 2, so that the extracted stalks may be collected and dumped into piles, as desired.

A seat may be secured to any part of the frame desired. If the rake-frame is used, the seat may be attached to it, and if the cutter-frame is used the seat may be supported by it.

The machine is intended to be drawn across the rows of stalks, pulling up several rows at a time as it passes along, owing to the diverging sides of the frame.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. The combination with a wheeled frame provided with puller-arms at its sides and with upwardly-projecting studs, of a clearing-frame provided with shoulders and with slots extending obliquely to the length of the clearing-frame, and with a longitudinal slot, said studs projecting through said slots, a pitman connected with the crank-axle of the drive-wheels and with the puller-frame for reciprocating it, substantially as set forth.

2. The combination with a wheeled frame triangular in outline, and having its sides beveled or undercut at predetermined distances apart to form gripping edges, and puller-arms secured to the side pieces immediately at the rear of the gripping edges, and a triangular puller-frame having shoulders adapted to move over the puller-arms and disengage therefrom the extracted stalks, and means for reciprocating the clearing-frame, substantially as set forth.

In testimony whereof I hereunto affix my signature in presence of two witnesses.

JESSE HALL.

Witnesses:
W. W. BENNETT,
J. C. GEIGER.